United States Patent [19]

Hansen

[11] 4,314,621
[45] Feb. 9, 1982

[54] FLUIDBORNE NOISE ATTENUATOR

[75] Inventor: Robert C. Hansen, East Peoria, Ill.

[73] Assignee: Caterpillar Tractor Co., Peoria, Ill.

[21] Appl. No.: 81,219

[22] PCT Filed: Mar. 7, 1979

[86] PCT No.: PCT/US79/00140
§ 371 Date: Mar. 7, 1979
§ 102(e) Date: Mar. 7, 1979

[87] PCT Pub. No.: WO80/01933
PCT Pub. Date: Sep. 18, 1980

[51] Int. Cl.³ .................. F01N 1/04; F16L 55/02
[52] U.S. Cl. .................... 181/233; 181/248; 181/252; 181/276
[58] Field of Search ........... 181/227, 233, 244, 246, 181/247, 250, 252, 270, 281, 230, 276; 138/26, 30, 37, 39, 178

[56] References Cited

U.S. PATENT DOCUMENTS

| | | | |
|---|---|---|---|
| 1,844,106 | 2/1932 | Schnell | 181/252 |
| 2,261,948 | 11/1941 | Beach | 181/233 |
| 2,392,247 | 1/1946 | Katcher | 181/270 |
| 2,495,693 | 1/1950 | Byrd Jr. et al. | 181/233 X |
| 3,113,635 | 12/1963 | Allen et al. | 181/252 |
| 3,142,354 | 7/1964 | Kammerer et al. | 181/252 |
| 3,532,125 | 10/1970 | Everett et al. | 138/30 |
| 3,665,967 | 5/1972 | Kachnik | 138/178 X |
| 4,067,195 | 1/1978 | Malecha | 60/469 |
| 4,086,984 | 5/1978 | Johansson | 181/230 X |

FOREIGN PATENT DOCUMENTS

| | | | |
|---|---|---|---|
| 1066962 | 4/1967 | United Kingdom | 138/125 |
| 841828 | 7/1960 | United Kingdom | 181/156 |

Primary Examiner—Joseph W. Hartary
Assistant Examiner—Benjamin R. Fuller
Attorney, Agent, or Firm—Phillips, Moore, Weissenberger, Lempio & Majestic

[57] ABSTRACT

A fluidborne noise attenuator (14) comprises a dampening medium (27) which exhibits a bulk modulus (e.g., 50,000 psi to 180,000 psi) substantially greater than that of an inert gas, such as nitrogen, and substantially less than that of a hydraulic working fluid (e.g., 225,000 psi). The attenuator (14) is capable of attenuating noise levels of hydraulic fluid over wide frequency and mean system pressure ranges in contrast to conventional attenuators which are "tuned" for the attenuation of noise levels at a specific frequency and mean system pressure.

15 Claims, 1 Drawing Figure

U.S. Patent                   Feb. 9, 1982                   4,314,621
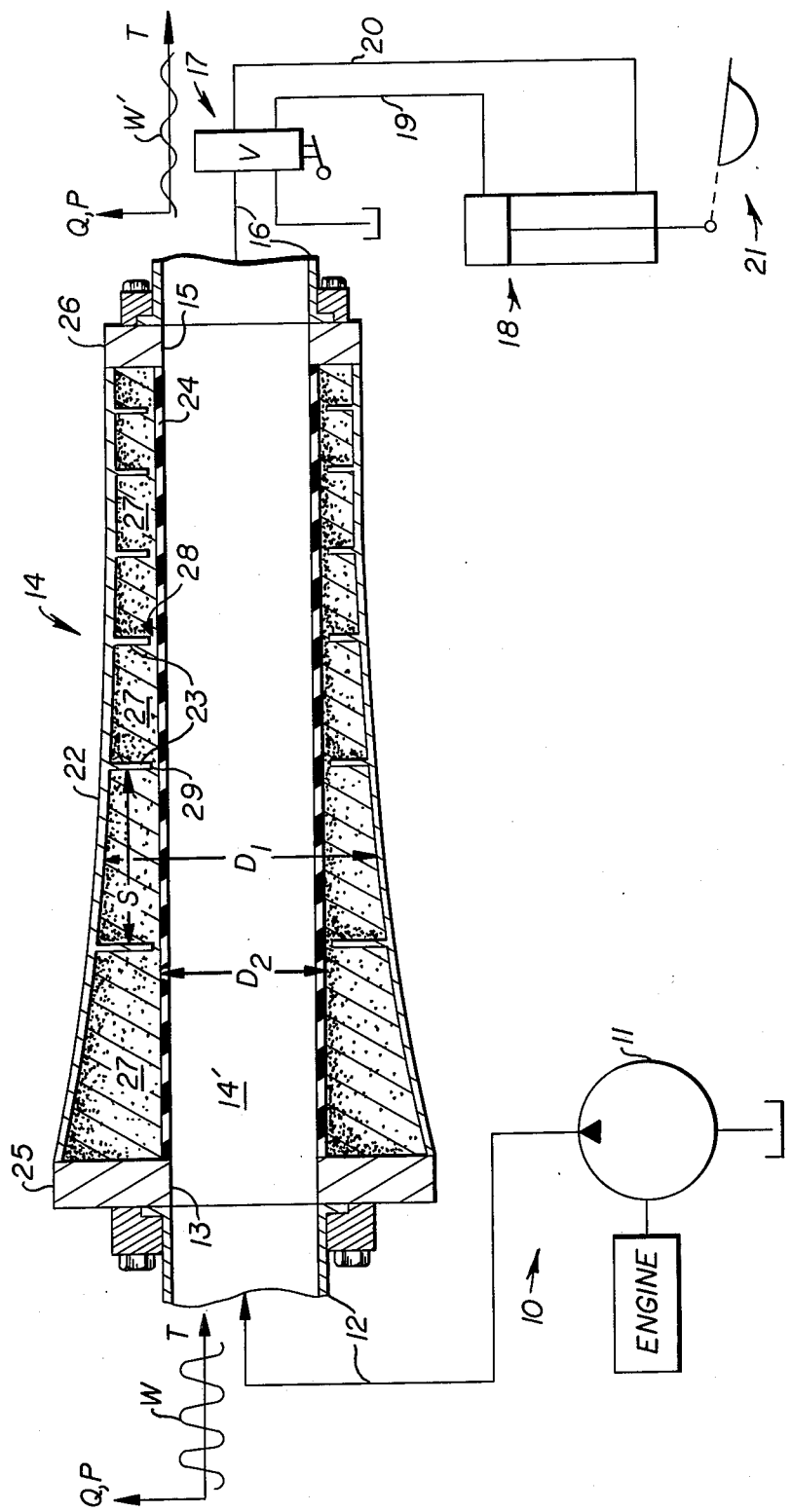

FLUIDBORNE NOISE ATTENUATOR

DESCRIPTION

Technical Field

This invention relates to a fluidborne noise attenuator for attenuating a wide range of noise levels generated by fluid flowing therethrough.

Background Art

The utilization of high-pressure fluid circuits for the selective actuation of work implements on construction vehicles, for example, has given rise to the generation of relatively high noise levels. Such noise levels are primarily occasioned by the flow and pressure pulsations generated in the circulated hydraulic fluid by the pump and attendant working components of the fluid circuit. Various attempts have been made to provide an attenuator in the fluid circuit for eliminating the noise problem but, to date, all such attempts have been found to be only partially effective when both the specific fluidborne noise frequencies and the system mean pressure vary significantly during a particular work cycle.

In the type of system mentioned above, the load on the system will vary during the work cycle and thus mean system pressures will vary over a wide range whereby conventional "tuned" attenuators have limited effect in the attenuation of noise levels. For example, one such conventional attenuator comprises a rigid outer vessel having an elastomeric tube disposed therein. A gas chamber is defined between the vessel and tube and contains an inert gas, such as nitrogen. In addition, a throttling tube is disposed within the elastomeric tube to communicate hydraulic fluid, flowing through the attenuator, to the elastomeric tube.

The pulses of the fluid flow through the attenuator thus pass through the throttling tube and against the elastomeric tube to compress the gas contained in the gas chamber. As suggested above, this type of attenuator tends to be highly "tuned" in that it is only effective for attenuating fluidborne noise when the mean system pressure is within a relatively narrow range.

Other types of conventional attenuators are also limited in their applications since they are only "tuned" to a particular frequency and thus cannot compensate for frequency changes resulting from changes in engine and pump speeds, as well as effects on frequency related to oil aeration level, system pressure, etc.

DISCLOSURE OF THE INVENTION

The present invention is directed to overcoming one or more of the problems as set forth above.

In one aspect of the invention, a hydraulic fluidborne noise attenuator comprises a rigid, tubular outer casing, flow passage means for communicating hydraulic fluid through the attenuator, and fluidborne noise means for exhibiting a bulk modulus substantially greater than the bulk modulus of a gas and substantially less than the bulk modulus of the hydraulic fluid to attenuate noise levels at frequencies that vary over at least substantially the entire frequency range of from 100 to 5,000 Hz generated by flow and pressure fluctuations of the hydraulic fluid by tuning the fluidborne noise attenuator to various portions of said entire frequency range. The fluidborne noise means is at least generally tubular in shape and tapers downwardly at least approximately uniformly with the diametrical size of said fluidborne noise means being larger at its first end than at its second end.

In another aspect of this invention, the hydraulic fluidborne noise attenuator includes a plurality of tuned compartment means for tuning the fluidborne noise attenuator to various portions of the entire frequency range.

The fluidborne noise attenuator of this invention is thus effective to provide high noise attenuation over broad frequency and mean pressure ranges.

BRIEF DESCRIPTION OF DRAWING

Other objects of this invention will become apparent from the following description and accompanying drawing which is a longitudinal sectional view of a fluidborne noise attenuator embodiment of the present invention, employed in a fluid circuit.

BEST MODE OF CARRYING OUT THE INVENTION

The drawing illustrates a fluid (hydraulic) circuit 10 comprising an engine-driven positive displacement pump 11 for communicating pressurized hydraulic fluid to a conduit 12. An inlet conduit 12 is suitably secured to an inlet 13 of an attenuator 14 which defines a flow passage 14' therethrough for communicating fluid flow to an outlet 15 thereof. An outlet conduit 16 is suitably interconnected between outlet 15 and a directional control valve 17. Directional control valve 17 functions in a conventional manner to communicate pressurized fluid to the rod or head end of a double-acting cylinder 18 and to simultaneously exhaust the other end thereof, via lines 19 and 20.

As shown, cylinder 18 is mechanically connected in a conventional manner to a work implement or tool 21, such as a loader bucket, to selectively place the work implement in a selected position of operation. Although hereinafter described fluidborne noise attenuator 14 is particularly adapted for use in conjunction with high pressure fluid circuits, such as the one generally shown in the drawing, the attenuator will find many other applications, as will be appreciated by those skilled in the arts relating hereto.

Fluidborne noise attenuator 14 essentially functions to attenuate noise levels generated by hydraulic fluid flowing through passage 14' thereof. As schematically illustrated, a particular sound wave W is represented by a wavy, horizontal line in which the upper part or crest of the wave indicates a condensation and the lower part or trough thereof indicates a rarification, as is well known to those skilled in the art. The abscissa of wave W represents time (T) plotted against the acoustic-frequency flow fluctuations (Q) or the related pressure fluctuations (P) of the hydraulic fluid, both on the ordinate of the wave.

It is also well known that the amplitude of vibration controls the intensity or loudness of the sound emanated by the hydraulic fluid. The sound becomes louder as the amplitude of vibration or wave increases, and the intensity decreases as the distance from the source producing the sound, such as pump 11, increases.

Attenuator 14 functions to dampen or reduce the amplitude wave W at inlet 13 down to an acceptable level, illustrated by wave W' at outlet 15 of the attenuator 14. It should be understood that wave W is a schematic representation of the noise phenomena which are considerably more complex than that illustrated. For example, the pulses of the fluid flowing through attenuator 14 will create an infinite number of waves W of varying frequencies and amplitudes with the mean pressure of the hydraulic fluid varying over a broad range. Attenuator 14 will effectively attenuate the noise levels of the hydraulic fluid passing through flow passage 14', over broad frequency and mean pressure ranges.

Fluidborne noise attenuator 14 comprises a tubular casing 22, preferably composed of a rigid metal, such as steel. A plurality of optional baffles 23 are secured internally of casing 22 and extend radially inwardly towards a longitudinal axis of attenuator 14. It should be noted that each adjacent pair of longitudinally spaced baffles 23 are separated by a distance S which distance is shown as becoming progressively less from inlet 13 to outlet 15 of attenuator 14. Although the specific spacing of baffles 23 will depend upon the particular attenuator application under consideration, the spacing between a first pair of baffles adjacent to inlet 13 is shown to be at least twice as great as the spacing between a second pair of baffles adjacent to outlet 15. It will be understood by those skilled in the art that other spacing arrangements of baffles 23 could be utilized, such as even or random spacing.

Fluidborne noise attenuator 14 further comprises a flexible and thin-walled conduit 24, defining flow passage 14' therethrough. Conduit 24 is preferably cylindrical and is disposed in concentric relationship relative to a longitudinal axis of attenuator 14. The opposite ends of conduit 24 are secured to a pair of longitudinally spaced end plates 25 and 26, defining inlet 13 and outlet 15 therein, respectively. The inner surface of each plate 25 and 26 may be considered to constitute a baffle similar to each baffle 23.

Conduit 24 may be composed of any suitable material, preferably a plastic or elastomeric solid polymeric material, which exhibits sufficient flexibility to expand and contract radially when subjected to internal fluid pressures of a predetermined magnitude. For example, conduit 24 may be composed of a suitable polymeric material exhibiting a durometer hardness in the range of from 45 to 80 Shore A whereby conduit 24 will flex radially when subjected to internal fluid pressures. Conduit 24 must also be compatible chemically with the hydraulic fluid flowing therethrough. For example, when the hydraulic fluid constitutes a fire-resistant phosphate ester, conduit 24 could be composed of Teflon (TFE) to be compatible therewith.

The space between casing 22 and conduit 24 is at least substantially filled with a noise dampening medium or fluidborne noise means 27, having a bulk modulus substantially greater than an inert gas, but substantially less than the hydraulic working fluid (e.g., 225,000 psi) flowing through passage 14'. In the preferred embodiment of this invention, the bulk modulus of dampening medium 27 is preferably in the order of 50,000 psi to about 180,000 psi and more preferably in the order of 50,000 psi to 100,000 psi. Also, dampening medium 27 is preferably in fluid form, although it could be elastomeric, as described below. Dampening medium 27 is preferably composed of a homogeneous material, such as silicone or rubber, which will function to dampen noise levels in the frequency range of from 100 to 5,000 Hz.

A clearance 28 is preferably provided between radially inner end 29 of each baffle 23 and conduit 24 whereby the separated chambers containing dampening medium 27 normally communicate with each other, except when conduit 24 flexes radially outwardly to close one or more of the clearances 28. The primary function of conduit 24 is to separate the hydraulic fluid flowing therethrough from dampening medium 27 to prevent co-mingling thereof, particularly when the dampening medium is maintained in a fluidized state.

In applications wherein dampening medium 27 exhibits sufficient solidarity (i.e., elastomeric) to prevent such co-mingling, conduit 24 could be eliminated and dampening medium 27 could be bonded or otherwise suitably secured directly to casing 22. The inside diameter of dampening medium 27 could thus be formed to define a tubular, preferably cylindrical, wall to further define passage 14' for conducting the hydraulic fluid through attenuator 14. In such an application, dampening medium 27 would still provide the desired noise dampening desiderata throughout a wide range of frequency levels.

In order to further increase the range of dampened frequencies, casing 22 and the diametrical size ($D_1$ minus $D_2$) of dampening medium 27 are preferably tapered downwardly, as shown, from inlet 13 to outlet 15 of attenuator 14. Baffles 23, which separate dampening medium 27 into individual compartments, will further aid in increasing such dampening range since each individual compartment of dampening medium 27 may be tuned for dampening a particular small range of frequencies. As indicated above, dampening medium 27 preferably has a bulk modulus within the range of from 50,000 psi to 100,000 psi to provide the desired noise dampening effect. Thus, dampening medium 27 will exhibit a spring rate and bulk modulus well below that of hydraulic oil which is normally used in the type of fluid control circuits under consideration and which has a bulk modulus in the range of 225,000 psi.

As also discussed above, in a conventional dampening system wherein an inert gas, such as nitrogen, is employed as a dampening medium, the dampening medium is highly compressible. Thus, such a dampening medium can only be tuned for a specific frequency and mean system pressure application in contrast to attenuator 14 of this invention which is designed to dampen noise levels over a wide range of frequencies and means system pressures. For example, pump 11 is normally driven by a diesel engine, which is conditioned to operate over wide speed ranges, resulting in a wide range of flow and pressure fluctuations.

As shown in the drawing, the inside surface (diameter $D_1$) of casing 22 and the outer surfaces of composite dampening medium 27 may be generally formed as a hyperboloidic section to provide the above-discussed taper from inlet 13 to outlet 15 of attenuator 14. However, it should be understood that the casing as well as the general configuration of attenuator 14, including dampening medium 27, could by cylindrical, frustoconical, or otherwise suitably shaped. However, it is believed that the tapered configuration of the attenuator will aid in increasing the range of dampened frequencies, as discussed above.

INDUSTRIAL APPLICABILITY

Fluidborne noise attenuator 14 finds particular application to the type of fluid circuit 10, illustrated in the drawing, wherein pressurized fluid (hydraulic) is communicated from pump 11, through attenuator 14 and to directional control valve 17, for selectively controlling the actuation of double-acting cylinder 18 and work implement or tool 21. However, attenuator 14 will find other obvious applications, well known to those skilled in the arts relating hereto, wherein fluid flow and pressure fluctuations will generate a wide range of noise frequencies. In comparison, the above-discussed and conventional type of fluidborne noise attenuator wherein an inert gas is used as a dampening medium will function efficiently for an application wherein fluid flow and mean pressure remain substantially constant, but will not work efficiently in the type of fluid circuit illustrated in the drawing wherein wide flow and pressure fluctuations are prevalent.

When the illustrated engine drives pump 11 during the normal operation of a construction vehicle, for example, the operator will periodically actuate directional control valve to either extend or retract cylinder 18. The flow and pressure fluctuations of the hydraulic fluid communicated to line 12 from the pump will create a wide range of noise frequencies which are efficiently dampened by attenuator 14 in the manner described above. As schematically illustrated, wave W at inlet 13 of attenuator 14, reflecting both flow fluctuations (Q) and pressure fluctuations (P), will have its amplitude substantially dampened, as depicted by wave W' at outlet 15 of attenuator 14. The fluidborne noises thus created by pump 11 and attendant components of circuit 10 will be substantially eliminated.

Other aspects, objects, and advantages of this invention can be obtained from a study of the drawing, the disclosure, and the appended claims.

I claim:

1. A hydraulic fluidborne noise attenuator (14) comprising
    a rigid, tubular outer casing (22),
    flow passage means (14') for communicating hydraulic fluid through said attenuator (14), said flow passage means (14') having an inlet (13) at a first end thereof and an outlet (15) at a second end thereof, and
    fluidborne noise means (27) for exhibiting a bulk modulus substantially greater than the bulk modulus of a gas and substantially less then the bulk modulus of said hydraulic fluid to attenuate noise levels at frequencies that vary over at least substantially the entire frequency range of from 100 to 5,000 Hz generated by flow and pressure fluctuations of said hydraulic fluid by tuning said fluidborne noise attenuator (14) to various portions of said entire frequency range, said fluidborne noise means (27) being at least generally tubular in shape and tapered downwardly at least approximately uniformly from said first end towards said second end of said attenuator with the diametrical size of said fluidborne noise means (27) being larger at said first end than at said second end.

2. The fluidborne noise attenuator (14) of claim 1 wherein said fluidborne noise means (27) has a bulk modulus in the order of from 50,000 psi to about 180,000 psi.

3. The fluidborne noise attenuator (14) of claim 1 wherein said fluidborne noise means (27) constitutes a homogeneous material.

4. The fluidborne noise attenuator (14) of claim 3 wherein said homogeneous material at least essentially includes silicone.

5. The fluidborne noise attenuator (14) of claim 3 wherein said fluidborne noise means (27) at least essentially includes an elastomeric material.

6. The fluidborne noise attenuator (14) of claim 1 further including flexible conduit means (24) for defining said flow passage means (14') therethrough and for flexing radially outwardly when subjected to internal pressures by said hydraulic fluid, said fluidborne noise means (27) being disposed radially between said casing (22) and said conduit means (24).

7. The fluidborne noise attenuator (14) of claim 6 wherein said conduit means (24) is composed of a polymeric material.

8. The fluidborne noise attenuator (14) of claim 1 wherein the diametrical size of said fluidborne noise means (27) at said first end is at least approximately twice as large as the diametrical size of said fluidborne noise means at said second end.

9. The fluidborne noise attenuator (14) of claim 1 further including a tubular casing (22) surrounding said fluidborne noise means (27) and wherein an inside surface of said casing (22) and an outer surface of said fluidborne noise means (27) at least generally define a hyperboloidic section.

10. The fluidborne noise attenuator (14) of claim 1 further including a plurality of radially disposed and longitudinally spaced baffles (23) extending radially inwardly into said fluidborne noise means (27) to form compartment means for tuning said fluidborne noise attenuator (14) to various portions of said entire frequency range, the longitudinal spacing between said baffles (23) being varied.

11. The fluidborne noise attenuator (14) of claim 10 wherein the spacing between each pair of longitudinally adjacent baffles (23) becomes less from a first end of said attenuator towards a second end thereof.

12. The fluidborne noise attenuator (14) of claim 11 wherein the spacing between a first pair of baffles (23) adjacent to the first end of said attenuator is at least twice as great as the spacing between a second pair of baffles (23) adjacent to the second end of said attenuator.

13. The fluidborne noise attenuator (14) of claim 10 further including flexible conduit means (24), disposed interiorly of said fluidborne noise means (27), for defining said flow passage means (14') therethrough and for flexing radially when subjected to internal pressures by said hydraulic fluid.

14. The fluidborne noise attenuator (14) of claim 13 wherein each of said baffles (23) extends radially inwardly towards said flexible conduit means (24) to define a clearance (28) between an end (29) of each baffle (23) and said flexible conduit means (24).

15. A hydraulic fluidborne noise attenuator (14) comprising
    a rigid, tubular outer casing (22),
    flow passage means (14') for communicating hydraulic fluid through said attenuator (14), said flow passage means (14') having an inlet (13) at a first end thereof and an outlet (15) at a second end thereof, and
    fluidborne noise means (27) for exhibiting a bulk modulus substantially greater than the bulk modulus of a gas and substantially less than the bulk modulus of said hydraulic fluid to attenuate noise levels at frequencies that vary over at least substantially the entire frequency range of from 100 to 5,000 Hz generated by flow and pressure fluctuations of said hydraulic fluid, said fluidborne noise means (27) being at least generally tubular in shape and tapered downwardly at least approximately uniformly from said first end towards said second end of said attenuator with the diametrical size of said fluidborne noise means (27) being larger at said first end than at said second end, said fluidborne noise means (27) including a plurality of tuned compartment means for tuning said fluidborne noise attenuator (14) to various portions of said entire frequency range.

* * * * *

UNITED STATES PATENT AND TRADEMARK OFFICE
CERTIFICATE OF CORRECTION

PATENT NO. : 4,314,621

DATED : February 9, 1982

INVENTOR(S) : Robert C. Hansen

It is certified that error appears in the above-identified patent and that said Letters Patent are hereby corrected as shown below:

Column 1, lines 57 and 66, insert --dampening-- after "noise".
Column 2, line 1, insert --dampening-- after "noise".
Column 3, line 50, insert --dampening-- after "noise".
Claim 1, lines 36, 45, and 50 (claim lines 9, 18, and 23), insert
  --dampening-- after "noise".
Claim 2, line 53 (claim line 2), insert --dampening-- after "noise".
Claim 3, line 57 (claim line 2), insert --dampening-- after "noise".
Claim 5, line 62 (claim line 2), insert --dampening-- after "noise".
Claim 6, line 68 (claim line 5), insert --dampening-- after "noise".
Claim 8, lines 7 and 10 (claim lines 2 and 5), insert --dampening--
  after "noise".
Claim 9, lines 13 and 15 (claim lines 3 and 5), insert --dampening--
  after "noise".
Claim 10, line 19 (claim line 4), insert --dampening-- after "noise".
Claim 13, line 35 (claim line 3), insert --dampening-- after "noise".
Claim 15, lines 51, 58, 63, and 65 (claim lines 9, 16, 21, and 22),
  insert --dampening-- after "noise".

Signed and Sealed this

Twelfth Day of October 1982

[SEAL]

Attest:

GERALD J. MOSSINGHOFF

Attesting Officer — Commissioner of Patents and Trademarks